(12) United States Patent
Dietsch et al.

(10) Patent No.: US 7,693,654 B1
(45) Date of Patent: Apr. 6, 2010

(54) METHOD FOR MAPPING SPACES WITH RESPECT TO A UNIVERSAL UNIFORM SPATIAL REFERENCE

(75) Inventors: Jeanne Dietsch, Peterborough, NH (US); William Kennedy, Peterborough, NH (US)

(73) Assignee: ActivMedia Robotics/MobileRobots, Amherst, NH (US)

( * ) Notice: Subject to any disclaimer, the term of this patent is extended or adjusted under 35 U.S.C. 154(b) by 705 days.

(21) Appl. No.: 11/603,242

(22) Filed: Nov. 21, 2006

Related U.S. Application Data

(60) Provisional application No. 60/739,852, filed on Nov. 23, 2005.

(51) Int. Cl.
*G01C 21/00* (2006.01)
(52) U.S. Cl. ...................................... 701/207
(58) Field of Classification Search ................ 701/200, 701/207, 213–215
See application file for complete search history.

(56) References Cited

U.S. PATENT DOCUMENTS

| | | | |
|---|---|---|---|
| 6,009,359 A | 12/1999 | El-Hakim et al. | |
| 6,363,161 B2 | 3/2002 | Laumeyer et al. | |
| 6,453,056 B2 | 9/2002 | Laumeyer et al. | |
| 6,917,893 B2 | 7/2005 | Dietsch et al. | |
| 2004/0139049 A1* | 7/2004 | Hancock et al. | 707/1 |

OTHER PUBLICATIONS

Gutmann, S. et al., "Incremental Mapping of Large Cyclic Environments," Proceedings of the IEEE International Symposium on Computational Intelligence in Robotics and Automation (CIRA) (2000).
Liu, Y. et al., "Using EM to Learn 3D Models with Mobile Robots," http://www-2.cmu.edu/.about.thrun/papers/thrun.3D-EM.html.
Thrun, S., "A Probabilistic Online Mapping Algorithm for Teams of Mobile Robots," Int'l J. Robotics Res. 20(5):335-363 (2001).

* cited by examiner

*Primary Examiner*—Yonel Beaulieu
(74) *Attorney, Agent, or Firm*—Nutter McClennen & Fish LLP

(57) ABSTRACT

A method for generating maps of a desired area that are referenced to a universal uniform spatial reference frame includes a mobile platform having a mapping processor and at least one mapping sensor is provided. The mapping sensor is applied to determine the location of features to be mapped relative to the mobile platform. The mobile platform is moved to a new location, and the mapping sensor is further applied to determine the location of features to be mapped relative to the mobile platform. These steps are repeated until the desired area is mapped. The at least one mapping sensor is also applied to locate at least one position on the map of the desired area on a universal uniform spatial reference frame. Positions on the map of the desired area are transformed into the universal uniform spatial reference frame.

31 Claims, 7 Drawing Sheets

METHOD FOR MAPPING SPACES WITH RESPECT TO A UNIVERSAL UNIFORM SPATIAL REFERENCE

RELATED APPLICATIONS

This application claims priority to U.S. Provisional Patent Application Ser. No. 60/739,852, filed on Nov. 23, 2005 and entitled "Method for Improved Globally Referenced Mapping of Spaces with Inadequate Satellite Reception, which application is incorporated herein by reference in its entirety.

BACKGROUND OF THE INVENTION

Creating spatial representations of the world for use in decision-making, navigation and many other applications, has grown into an enormous GIS (Geographical Information System, or sometimes, Global Information System) that links natural and man-made features with their relative and unique 3-D positions on or near Earth. Data include Earth topography and vegetation, as mostly gathered by satellite imagery. Other Features, such as the centerline of a road, are gathered by driving a vehicle with a GPS (Global Positioning System) system and noting the location of intersections and waypoints. Utility locations are input by surveying with GPS. Collected into GIS databases, the data subsequently are used for vehicle navigation, building operations, emergency response, environmental health, and a wide variety of other applications.

In one potential use of GIS data, the US Military has declared that one-third of its forces need to be robotic by 2015. Globally positioned Maps (maps referenced to the GIS) are the most efficient, seamless means for indoor and outdoor navigation by military and other robots. One problem with creating such maps, however, is that GPS currently is not pervasive. It is not available indoors or wherever GPS satellite signals are blocked or weak, such as in areas with heavy forestation or in dense urban areas such as older sections of European and Asian cities. While methods exist that estimate and extrapolate GPS coordinates through signal-less spaces, these result in significant errors in GPS-poor outdoor regions.

Indoors, GPS is not used, so few up-to-date, automated "as-built" building interior floor plans exist, globally positioned or not. Instead, if a Map of a building exists at all, it typically is a vector-based CAD drawing by the designing architect. Since buildings rarely are built exactly as specified by the architect, the CAD drawing of the interior spaces usually does not even fit the building's actual exterior footprint. Remodeling and additions, both interior and exterior, rarely get included in the Map.

A wide range of mapping techniques exist, including for example, those described in U.S. Pat. No. 6,009,359 to El-Hakim et al. In this patent, the invention relates to a method of model generation and, more particularly, to a method of generating three-dimensional maps from range and intensity images created from by an imaging device and dead reckoning. This method requires enormous amounts of computer processing, which slows results. In addition, visual pattern-matching techniques are not exact, so inaccuracies result. Further, the maps generated are not related to GIS coordinate systems, so the resulting map is not usable within a GIS context. By this method, data gathered without GPS coordinates cannot be spatially associated.

U.S. Pat. No. 6,917,893 to Dietsch et al. describes a highly accurate spatial data collection apparatus for use in creating floor plans, maps and models of existing spaces. No methods are disclosed, however, for generating these maps in GIS space to provide for seamless navigation to outdoor spaces.

In fact, most common methods currently used for creating GIS Maps of GPS-poor spaces are manual: teams of people using various hand measuring devices, including tape measures and single-beam laser range finders. Linear measurements of each room are taken typically from only two points on each opposing surface; thus, in a rectangular room, the lengths of two sides of the rectangle would be the only measurements taken and not directly related to an adjoining room's measurements. Corners are assumed to be 90 degrees. The individual room measurements are then entered by hand into software that draws the building based on a "best fit" of the measurements. Because buildings are not perfectly square and measurements are not perfectly level, cumulative error results in a building's interior appearing to be larger or smaller than its exterior. Relating such measurements to exterior GIS coordinates is thus difficult. Further, indoor Features must be identified manually and separately with their GPS positions calculated in the mapped space, which is a very time consuming process.

SUMMARY OF THE INVENTION

The present invention involves the generation or making of maps in a universal uniform spatial reference frame. In preferred embodiments, the invention can generate maps in GIS space (i.e., using GPS coordinates) for spaces that cannot be mapped directly in GIS space because of inadequate reception of positioning signals used in GPS locating schemes.

In a first aspect of the invention, a method for generating maps of a desired area that are referenced to a universal uniform spatial reference frame is provided. In this method, a mobile platform having a mapping processor and at least one mapping sensor is provided. The mapping sensor is applied to determine the location of features to be mapped relative to the mobile platform. The mobile platform is moved to a new location, and the mapping sensor is further applied to determine the location of features to be mapped relative to the mobile platform, and a map the locations determined is generated or added to. These steps are repeated step until the desired area is mapped. The at least one mapping sensor is also applied to locate at least one position on the map of the desired area on a universal uniform spatial reference frame. Positions on the map of the desired area are transformed into the universal uniform spatial reference frame. The transformation calculations can take place concurrently with the data collection, or can take place after.

In a further aspect of the invention, a method for generating maps of a desired area that are referenced to a universal uniform spatial reference frame is provided. The method includes providing a mobile platform having a mapping processor and at least one mapping sensor. A marker is provided having a known location in the universal uniform spatial reference frame and the mobile platform is moved to a location within mapping range of the marker. The mapping sensor is applied to determine the location of the marker and the location of the marker in the universal uniform spatial reference is communicated to the mobile platform. Positions on the map of the desired area are transformed into the universal uniform spatial reference frame. Again, the transformation calculations can take place concurrently with the data collection, or can take place after.

BRIEF DESCRIPTION OF THE DRAWINGS

The invention will be more fully understood from the following detailed description taken in conjunction with the accompanying drawings.

DETAILED DESCRIPTION OF THE ILLUSTRATED EMBODIMENTS

Figure 1:
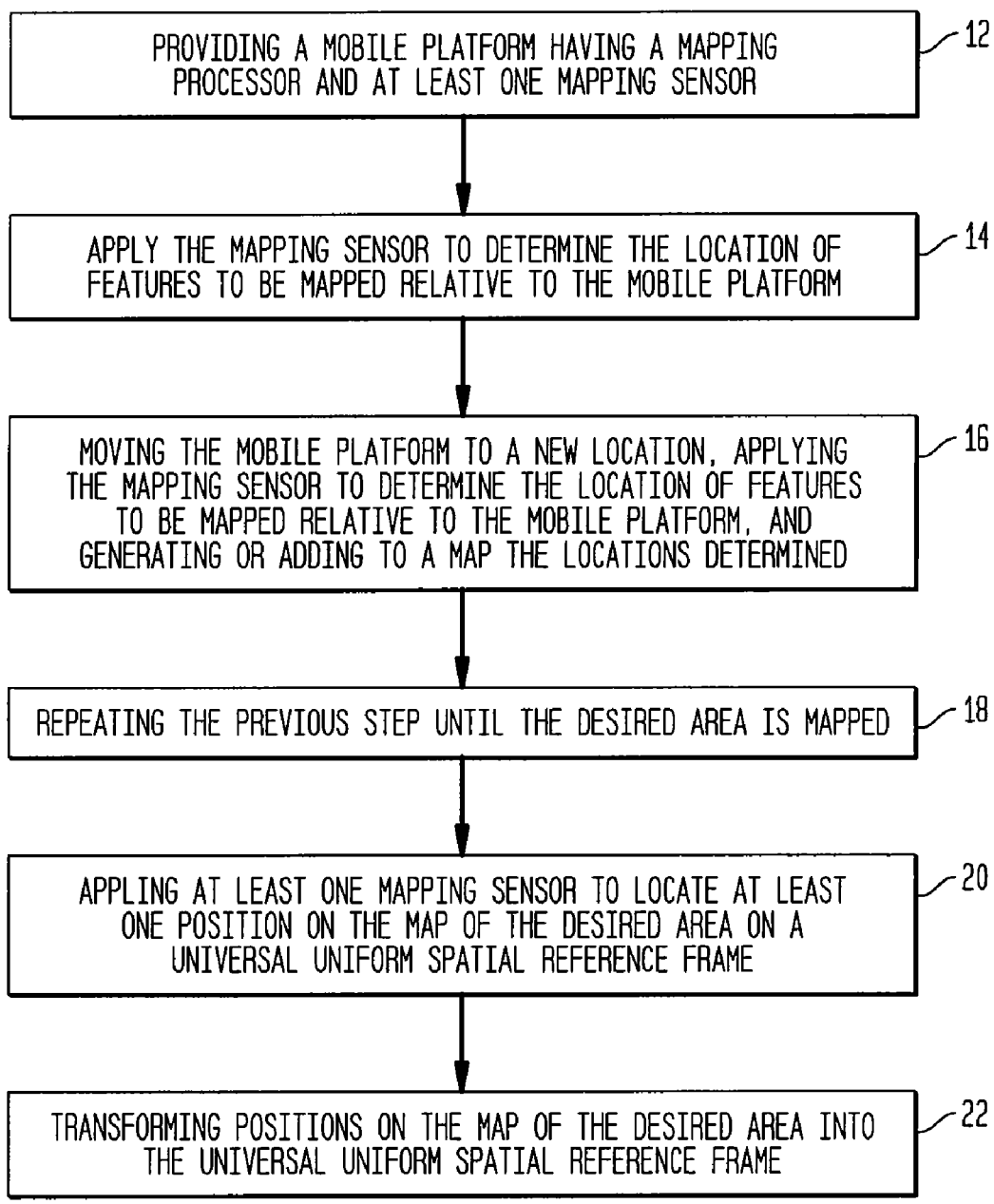
FIG. 1 provides a diagram illustrating a flow of steps in a method according to one embodiment of the invention.

An exemplary method 10 for generating maps of a desired area that are referenced to a universal uniform spatial reference frame is illustrated in FIG. 1. In one embodiment, the universal uniform spatial reference frame can be the GIS, and coordinates on the map can be provided in the format used by the GPS. As used herein, GIS refers to Global Information System, a generic term for a spatial database in which the spatial information is linked to GPS coordinates. Similarly, GPS refers to the Global Positioning System in which radio systems, typically satellite-based, provide three-dimensional position and time information to which suitably equipped receivers anywhere on or near the surface of the Earth compute their global position, velocity and orientation (heading).

In step 12 in the illustrated method, a mobile platform is provided with a mapping processor and at least one mapping sensor. The mapping sensor is then applied 14 to locate features to be mapped relative to the mobile platform. A feature, as used herein, refers to an object within the universal uniform spatial reference frame that may have associated attributes. An example of a feature might be a door. Attributes refer to characteristics of a feature. By way of further example where the feature is a door, its attributes might include the manufacturer of the door, the model name or number, the height and width of the door, and whether the door is open or closed. Features whose locations are determined by the mapping sensor can be added to the map.

The mobile platform can be moved 16 to a new location, and the mapping sensor applied again to determine the location of other features to be mapped relative to the mobile platform. Features can again be added to the map. The movement and sensor application can be continuous, i.e., the mobile platform may patrol an route or may otherwise be directed on a continuous basis while applying the mapping sensor continuously or the movement and sensor application can be discrete (point to point movement and sensing) or some combination of the two. This movement and sensing step can be repeated 18 until the desired area is fully mapped.

At least one mapping sensor can also be applied 20 to locate at least one position on the map on a universal uniform spatial reference frame. In one embodiment, the mapping sensor or sensors include a GPS receiver so that the mobile platform can track its position in GPS coordinates (and thus in a GIS) as it maps features. If at least part of the area to be mapped includes regions having good reception of satellite signals, this approach may be sufficient. Other ways of locating map positions on the universal uniform spatial reference frame are discussed below.

Positions on the map of the desired area can be transformed 22 into coordinates of the universal uniform spatial reference frame based upon the information obtained in step 20. Once one or more locations on the map are determined in GPS coordinates, all points on the map or that are thereafter mapped can be transformed into GPS coordinates. This transformation can occur in real time during mapping, or map and location information can be batch transformed.

Figure 2:
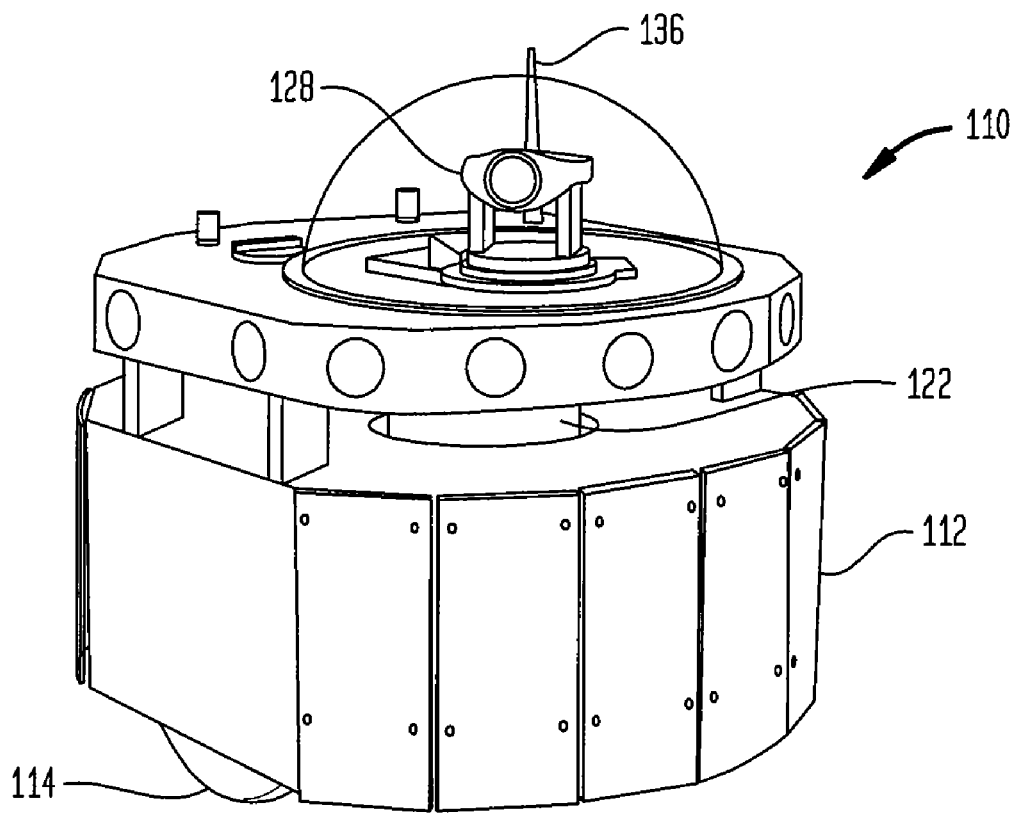
FIG. 2 illustrates an autonomous mobile mapping apparatus useful with the invention.
Figure 3:
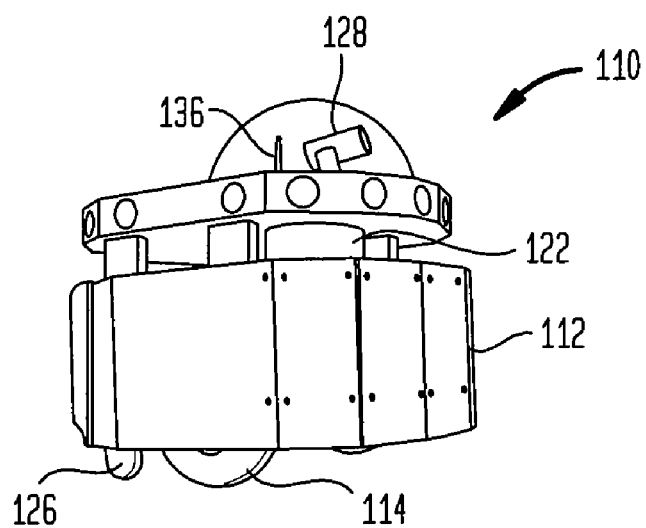
FIG. 3 provides an additional view of the autonomous mobile mapping apparatus of FIG. 2.

The mobile platform apparatus used in the method can take a variety of physical forms. One mobile platform apparatus that could be used with the invention is the spatial data collection apparatus described in U.S. Pat. No. 6,917,893, filed on Mar. 14, 2003, issued on Jul. 12, 2005, and entitled "Spatial Data Collection Apparatus and Method," which patent is hereby incorporated by reference in its entirety. The mobile platform can be movable using a handle as is prominently illustrated in the incorporated patent; it can be driven, for example by a joystick; or it can be autonomous using, for example, SLAM techniques (Simultaneous Localization And Mapping, a technique used by an autonomous vehicle to build a map within an unknown environment while at the same time keeping track of its current position). In the further embodiments illustrated below with respect to FIGS. 2, 3 and 4, an autonomous mobile mapping apparatus is described.

An exemplary autonomous mobile mapping apparatus 110 useful with the invention includes a mobile platform 112 and at least one wheel 114 attached to the platform 112, for example, using hubs. The autonomous mobile mapping apparatus 110 can also include one or more positional sensors 120 (shown schematically), such as shaft encoders and/or an inertial measurement unit (IMU), for generating the positional data. In addition, the positional sensors 120 could include a GPS receiver for determining the position of the autonomous mobile mapping apparatus in GPS coordinates. The autonomous mobile mapping apparatus 110 can further include one or more range-finding devices 122 located on the platform 112 for measuring and calculating the range data. The collection and correlation of the positional data and range data to produce the spatial data is described in greater detail below.

The preferred embodiment of the autonomous mobile mapping apparatus 110 is designed to permit movement in a way that will minimize errors in the positional data and the range data. The preferred embodiment includes wheels 114 that are preferably sized and located to allow the platform 112 to rotate in place. The wheels 114 are also large enough to allow the platform 112 to traverse or surmount common obstacles, such as sills, low steps, carpet edges and cords, without having to lift the apparatus 110 and while maintaining the platform 112 substantially level. The preferred embodiment of the apparatus 110 also includes casters 126 or another type of wheel or structure to keep the mobile platform 112 and the range-finding device(s) 122 level as the platform 112 moves.

The autonomous mobile mapping apparatus 110 can further include one or more other sensors 128 such as the illustrated recording devices (camera and microphone), for example. The autonomous mobile mapping apparatus 110 can also include additional sensors for recording other types of data (e.g., thermal, gas, radiation, biohazard, moisture, or motion) or other types of input devices for recording information such as text. Sensors 128 can also include sensors that are specific to collecting data regarding attributes of features on the map. For example, sensors 128 could include an RFID sensor, or, more precisely, an RFID tag interrogator. In a typical RFID system, individual objects are equipped with a small tag. The tag contains a transponder with a digital memory chip that is given a unique electronic product code or other attributes for the feature to which the tag is attached. The interrogator, an antenna packaged with a transceiver and decoder, emits a signal activating the RFID tag so it can read and/or write data to it. When an RFID tag is proximate to the interrogator, it detects the reader's activation signal. The reader decodes the data encoded in the tag's integrated circuit (silicon chip) and the data is passed to the on-board computational device 130.

Figure 4:
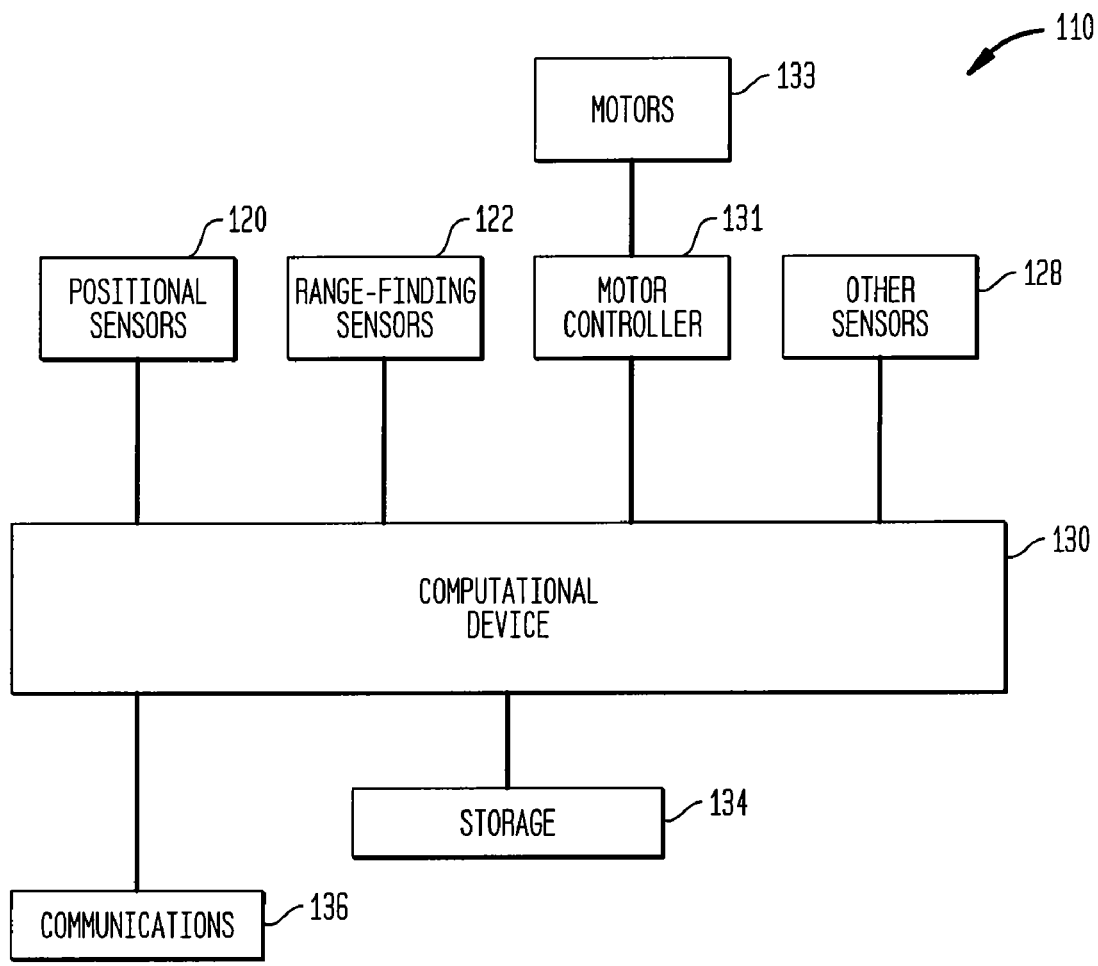
FIG. 4 provides a schematic illustration of elements of the autonomous mobile mapping apparatus of FIG. 2.

The autonomous mobile mapping apparatus 110 includes a computational device 130, such as an onboard personal computer (PC) having a processor, connected to the positional sensor(s) 120, the range-finding device(s) 122, and the other sensor(s) 128, as shown schematically in FIG. 4. The computational device 130 collects the positional data and the range data and correlates the range data to the positional data representing the locations of the apparatus 110 when the range-data was obtained. The correlated range data and positional data is referred to collectively as spatial data. Any information recorded by the sensor(s) 128 is positionally embedded with the spatial data according to the locations of the apparatus 110 at the time the information was recorded. A storage device or system 134 stores the range-data along with the positional data representing the locations of the apparatus 110 when the range-data was obtained (i.e., the spatial data). The storage system 134 also stores any positionally embedded recorded information. The data can also be transferred to an external computer network using communication element 136, which can be a wireless networking transceiver (using the Blue Tooth or other IEEE 802.11 protocols for example), for use in creating 2-D or 3-D graphical representations of the space, i.e., maps. The computational device 130 and/or computer network (not shown, communicated with through communications element 136) generally includes software for collecting the data for fusing and correlating the data to create a map.

In an exemplary embodiment, the positional sensors 120 include both shaft encoders for generating odometry data and an inertial measurement unit (IMU) for generating IMU data used to correct the odometry data. Alternatively, the shaft encoders can be used without the IMU, or vice versa, to generate the positional data. The shaft encoders can be attached to each wheel 114 to record the odometry data, i.e., changes in the position of each wheel 114 relative to the hub or other attachment to the apparatus 110. One example of a shaft encoder is a 2048-tick encoder such as the type that is known to those of ordinary skill in the art. Encoder driver software on the computational device 130 can collect and convert raw odometry data into (x, y, theta.) coordinate systems. One example of the encoder driver software can be incorporated in the controller software, such as in the Advanced Robotics Operations and Control Software (AR-COS) from MobileRobots Inc.

An IMU can be located on the apparatus 110 to measure radial and/or translational motion of the apparatus. The IMU can be a rate gyroscope, a magnetometer and/or an accelerometer. The IMU can be used to correct for errors in the odometry data (e.g., caused by slippage or other errors in encoder information), especially for determining the positional orientation of the apparatus. One example of an IMU is the inertial sensor available from Systron Donner Inertial under the name MMQ-50.

Where the apparatus 110 is autonomous, it will require a motor controller 131 and motors 133 to drive wheels 114. Motors and their controllers useful with the invention will be known to persons skilled in the art, and digital stepper motors may beneficially be used. Data collected from motor operation and control may also be used as a measure of odometry, in addition to or in place of shaft encoders.

The range-finding device 122 preferably includes a laser rangefinder capable of measuring range data (i.e., distances and angles with respect to the apparatus 110) from many points in the space nearly simultaneously (e.g., 180 or more range data points in a single scan). One example of the laser rangefinder is the type available from SICK AG under the name SICK LMS200. Rangefinder driver software can collects and/or process the raw range data on computational device 130 and/or any computer network communicated with using communications element 136. The spatial data collection apparatus 110 can also include another range-finding device for collecting 3-D range data.

In a further embodiment, the spatial data collection apparatus 110 the positional sensor(s) 120 together with a distance-measuring device, such as a Leica Distometer available from Leica Geosystems, held in place by a pan-tilt mount with angular position sensing. The distance measuring device is aimed at each corner of the room, doorway, window, and vertices of other objects and the range data is measured with respect to the vertices. The form of the room and position, size and shape of each doorway, window, and other object is calculated based on the vertices rather than the edges and/or surfaces of the shape.

The computational device can include application program interface (API) software for collecting and correlating the positional data and the range data. One example of API software is the Advanced Robotics Interface for Applications (ARIA) software available from MobileRobots Inc. The API software can collect and time-stamp the odometry data received from the positional sensors 120. The API software can use, for example, a Kalman filter to fuse any odometry data with any IMU data and to correct for any discrepancies in the odometry data based on the IMU data. The API software can then interpolate from the fused positional data where the apparatus was when the range data was measured. The API software can record the spatial data, i.e., the range data along with the positional data representing the locations of the apparatus when the range data was measured. Data collected by other sensor(s) 128 can be similarly linked to the time and location of the apparatus 110 when and where the data was collected.

The onboard computational device 130 can also include additional ports for connecting additional sensors, such as thermal, gas, moisture, motion or other sensing devices, to the spatial data collection apparatus 110.

Figure 5:
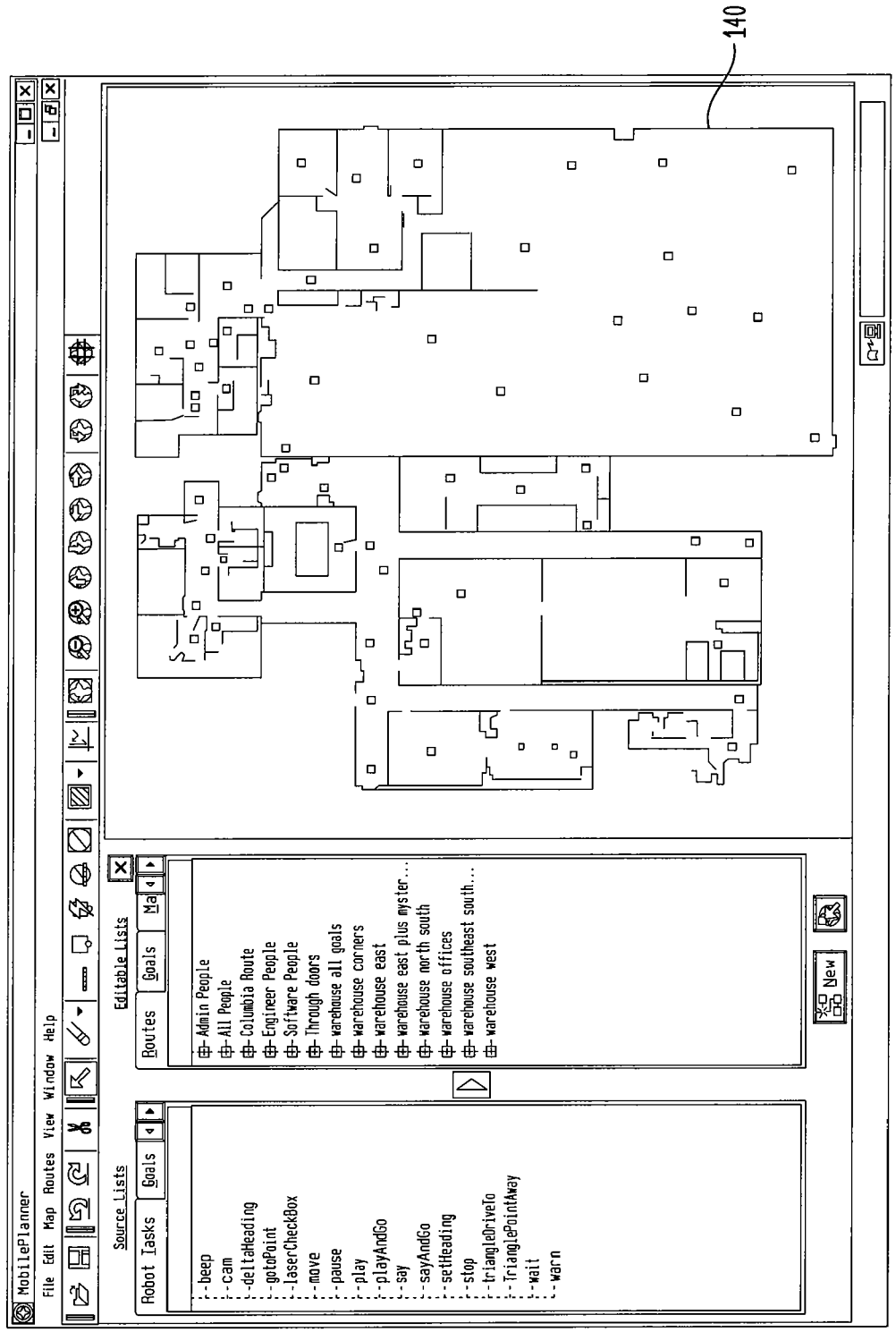
FIG. 5 illustrates a map generated by the autonomous mobile mapping apparatus of FIG. 2.

In one preferred embodiment, the computational device 130 and/or a computer network linked to the computational device 130 using communications element 136 includes mapper software for creating 2-D or 3-D graphical representations of the spatial data collected and viewing and/or editing the graphical representation. The terms "map, mapper and mapping" are used herein to refer to any type of 2-D or 3-D graphical representation of an existing space. An exemplary map 140 of an indoor space is illustrated in FIG. 5. The mapper software can include a map builder that converts spatial data log files into the 2-D or 3-D graphical representation and creates the representation of the spatial data with positionally embedded sensor data files. Thus, features and attributes, including permanent and temporarily placed audio, video, sensor or other data files that are related by means of naming convention, reference table or other means to a specific position in the map can be displayed and retrieved from that position in the map. The preferred embodiment of the map builder is capable of creating different types of map outputs in different formats such as vector formats (e.g., .dwg, .dlg, etc.) and grid formats (e.g., .bmp, etc.).

One example of a map builder includes software such as the type available under the name Scan Studio for performing the conversion of the log files and creating the 2-D or 3-D representations. Examples of these mapping algorithms, which are known to those of ordinary skill in the art, are described in greater detail by S. Gutmann and K. Konolige in the paper Incremental Mapping of Large Cyclic Environments, In Proceedings of the IEEE International Symposium on Computational Intelligence in Robotics and Automation (CIRA), 2000, and by Sebastian Thrun in the paper A Probabilistic Online Mapping Algorithm for Teams of Mobile Robots, International Journal of Robotics Research, 20(5):335-363, 2001, both of which are incorporated herein by reference. One example of three-dimensional map building algorithms, which are known to those of ordinary skill in the art, are described by Yufeng Liu, Rosemary Emery, Deepayan Chakrabarti, Wolfram Burgard and Sebastian Thrun in Using EM to Learn 3D Models with Mobile Robots, which is fully incorporated herein by reference.

Mapper software useful with the invention may also transform the spatial data so that positions on the map 140 can be referenced according to a universal uniform spatial reference frame such as by transforming positions into GPS coordinates for integration with GIS. This transformation can be based upon known position and orientation spatial data that is collected along with GPS coordinates for the autonomous mobile mapping apparatus 110 as is explained in greater detail below.

Figure 6:
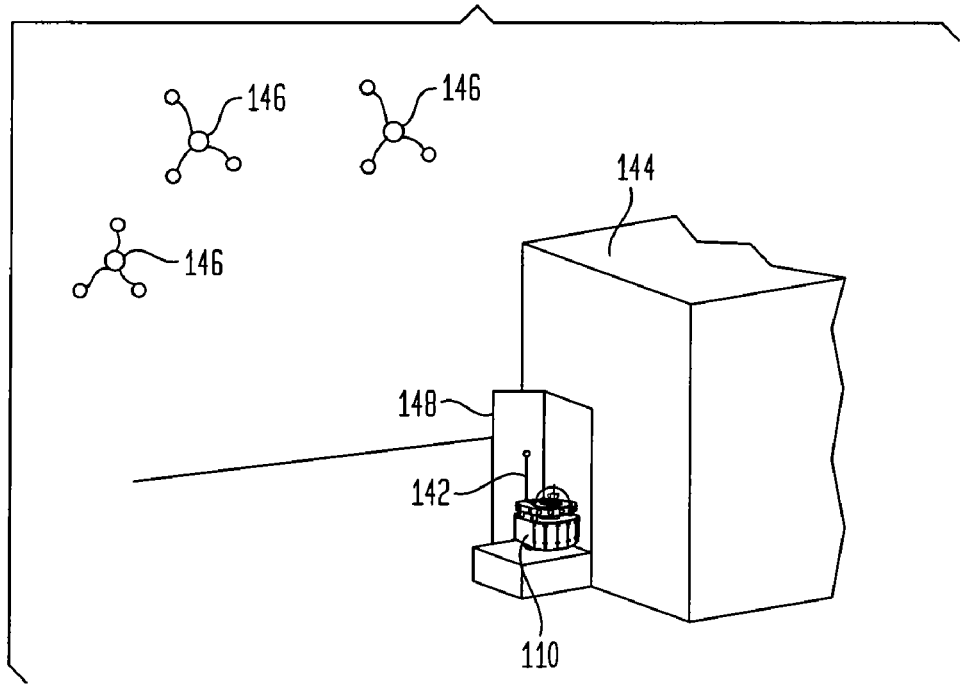
FIG. 6 illustrates an autonomous mobile mapping apparatus communicating with a satellite positioning system according to one embodiment of the invention.

One embodiment of the invention in which the autonomous mobile mapping apparatus 110 includes a GPS receiver 142 among its mapping sensors is illustrated in FIG. 6. In this embodiment, apparatus 110 is building a map of a space that is interior to building 144, where GPS satellite 146 reception is poor-to-unavailable inside. Apparatus 110 moves through door 148 and reaches a region of improved satellite 146 reception and obtains a GPS positional fix using GPS receiver 142. The apparatus 110 can now transform map coordinates to GPS coordinates as, for a given position, the apparatus 110 is aware of its location and orientation on the map, and if it can tell direction (north for example), it will have sufficient information to perform the transformation. Obtaining two or more such GPS position fixes can significantly improve the accuracy of the transformation. The GPS fixes can be obtained at the onset of mapping, during mapping, or after mapping by apparatus 110. Similarly, the transformation can be performed continuously after at least one GPS fix is obtained, or it can be done in batch form.

Further embodiments of the invention can include the use of "markers." Markers are distinctive elements that can be recognized by the positional 120, range-finding 122, or other sensors 128 on the autonomous mobile mapping apparatus 110. Markers may be distinctive emitters or reflectors used to fix an identifiable point of recognition within a mapped space. Markers may be natural or artificially applied. Examples of potential points of recognition include lights, highly polished reflectors, infrared emitters, RFID tags, visual shapes, and feature shapes that can be determined by the range-finder.

Markers can be used for a number of purposes with the invention. For example, a marker can represent a known position in the uniform universal spatial reference frame. In this way, when the apparatus 110 locates such a marker, it will obtain, for example, GPS coordinates that can be used to create a map transformation, or simply to verify the accuracy of the mapping process. Markers at known locations can also improve the accuracy of the mapping, particularly in conditions that confound other mapping or positional sensor data, such as slippery floors, ramps or other conditions that can confound the odometry or dead reckoning data. In such areas, markers such as high-contrast tape, easily identifiable visual symbols, close proximity RFID tags, infrared emitters or any easily distinguished objects can be placed in such a way as to be sensed by the sensors on apparatus 110. High contrast features of a building, such as lights may also be used as naturally occurring markers. Where markers are used in this way, each variety of marker can be given a weighting or certainty rating with the most precise markers having the highest ratings. For example, a 1-cm range RFID tag will have a position rating near certainty, while a high-frequency audio signal will have a far lower position certainty rating since its transmission is confounded by atmospheric conditions and reflective surfaces, among other circumstances.

In addition to markers being placed for improved map accuracy, markers may also be placed on features so that they will automatically be positioned within the map as they are recognized. The markers may uniquely identify features so that one or more attributes that are associated with the features, for example, an RFID tag may be a marker for a window that indicates a particular brand and model of window installed. This permits a GIS map system to not only locate the window, but know its dimensions and other attributes as well.

Figure 7:
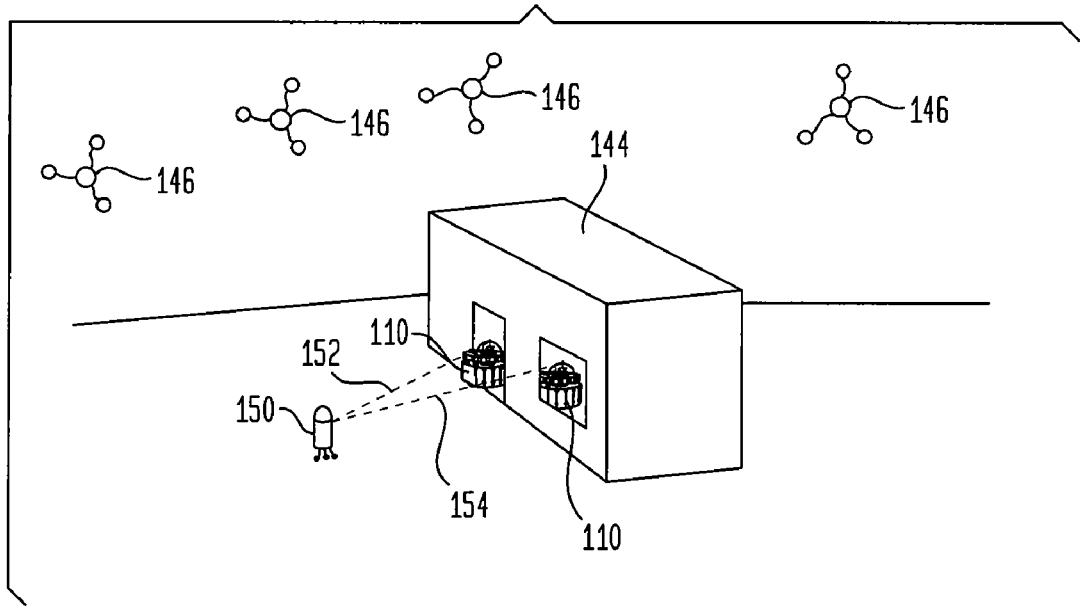
FIG. 7 illustrates an autonomous mobile mapping apparatus obtaining positional information regarding a marker according to one embodiment of the invention.

Turning now to FIG. 7, a marker 150, such as a GPS (or DGPS) receiver 150, having a position and, possibly, global orientation known in the universal uniform reference frame becomes a marker for transforming a map to the universal coordinates by having its coordinates and, possibly global orientation, as attributes. Automated mobile mapping apparatus 110 locates the position of the marker 150 from a location 152, for example, by using the laser rangefinder. The marker's global orientation may also be determined—by a triangular shape pointed north, for example, or otherwise communicable or determinable—the mapping apparatus now has sufficient information to transform map coordinates into the uniform reference frame.

The automated mobile mapping apparatus 110 may also locate the position and/or orientation of the marker 150 from a second location 154. The system now has sufficient information to transform and/or improve the accuracy of the map coordinates into the uniform reference frame.

Figure 8:
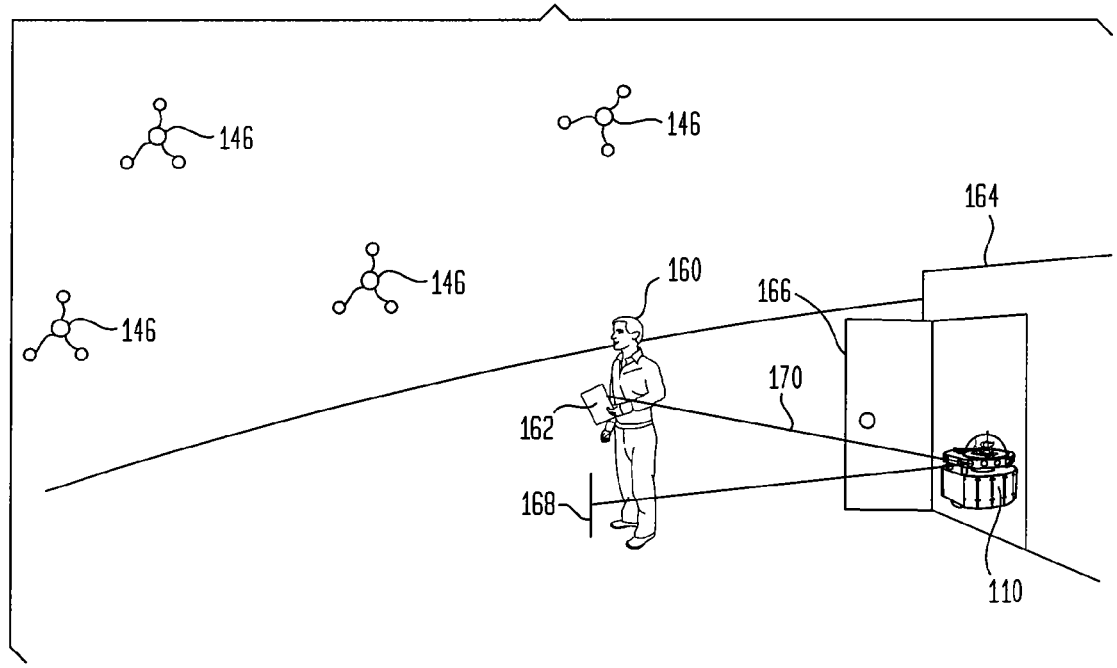
FIG. 8 illustrates an autonomous mobile mapping apparatus obtaining positional information regarding a handheld position receiver according to one embodiment of the invention.

In FIG. 8, a person 160 obtains a GPS position using a handheld or portable GPS receiver device 162 via satellites 146 or other global transmitters at a location where signal strength is sufficient to do so. Autonomous mobile mapping apparatus 110, positioned within a building 164 (and within map space) and aiming out a door 166 locates the horizontal distance 168 and angular offset 170 of device 162. Apparatus 110 can communicate directly with device 162 using communications element 136 to obtain its GPS coordinates, or person 160 could enter them into the system using an appropriate user interface. Person 160 could move to another location and provide a second GPS positional fix to improve the accuracy of the map to GPS coordinate transformation.

Figure 9A:
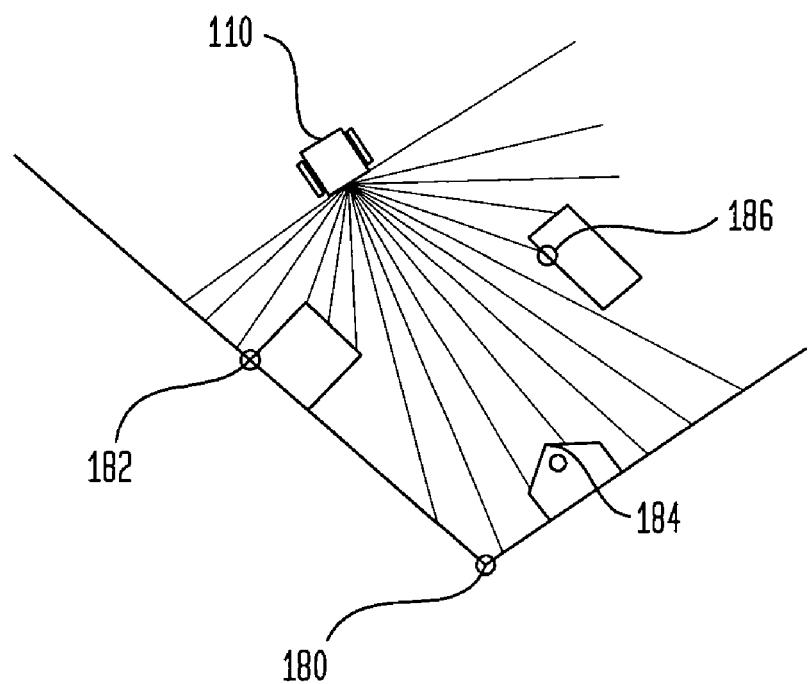
FIG. 9A illustrates an autonomous mobile mapping apparatus obtaining positional information regarding a number of markers according to one embodiment of the invention.
Figure 9B:
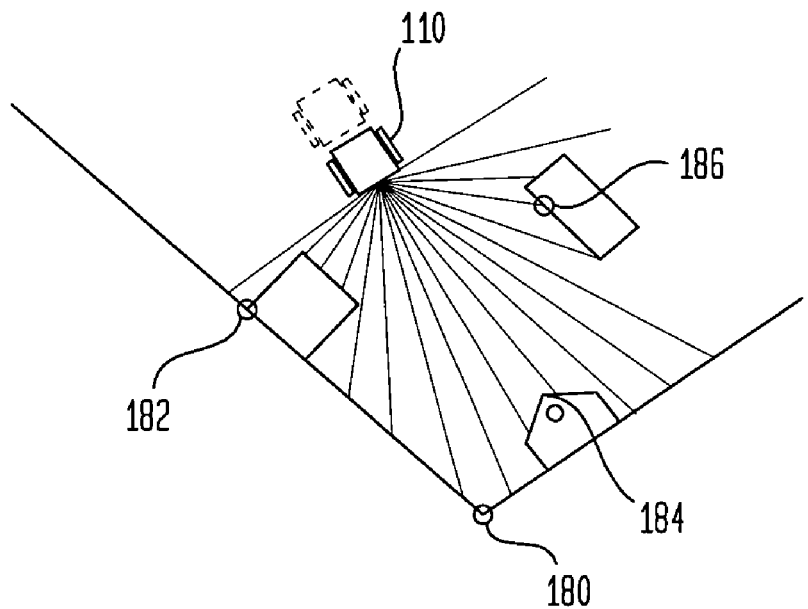
FIG. 9B illustrates the autonomous mobile mapping apparatus of FIG. 9A obtaining a second positional information reading regarding the markers of FIG. 9B.

In FIGS. 9A and 9B, autonomous mobile mapping apparatus 110 is shown determining its position with respect to a number of markers by taking positional measurements from two different positions. Two markers 180, 182 are naturally occurring in the space to be mapped. Marker 180 is simply a corner in the room. Marker 182 is a corner created by a feature in the room that is preferably a permanent feature so that the corner remains in place. Where autonomous mobile mapping apparatus 110 includes a range-finding sensor 122, the apparatus can readily recognize the shapes of these corners. While either of these corners 180, 182 may be markers on their own, where the corner forms a common angle (such as 90 degrees), the two corners together may form a single marker—that is, two 90 degree corners having a certain spacing and orientation may form a marker.

FIGS. 9A and 9B also include a marker 184 having a shape, one or more angles configured to be recognized by the range-finding sensor 122 as a marker. Because of the relatively unique angle or group of angles, and especially when information about its placement is known by the autonomous mobile mapping apparatus (for example, exactly one marker having this shape is present in a particular room), the range-finding sensor can uniquely determine the identity and the position of the marker 184.

Alternatively, an active marker 186 can be provided where the marker is a feature in the space that has attributes that can be determined by sensors 128 on the autonomous mobile mapping apparatus 110.

Where markers indicate a location in GPS coordinates, for example, by determining the location of a marker in map space from two locations the map can be transformed into GIS space. By locating two or more such markers from a single place, a transform can be created.

Where a marker indicates both global location and orientation, for example, by determining its location and orientation in map space is sufficient for the map to be transformed into GIS space.

An exemplary computation using the principles of the invention to create a map usable in a universal uniform spatial reference frame collects data and, separately or concurrently, generates the map. Data collection can involve repeating the following steps until range-finding data to all surfaces that will be included in the spatial model or map have been measured. The autonomous mobile mapping apparatus is moved a small distance. An X, Y, Theta dead-reckoned position and orientation can be computed by measuring and fusing data from positional sensors that can relate to wheel rotation, inertial (tri-axial, for example) and/or gyroscopic readings of forward and radial motion using Kalman filtering. Range and angular readings to surfaces in proximity to the autonomous mobile mapping apparatus are made using the range-finding sensors. If markers are present, range and angular readings can be taken to any markers to correct dead reckoning and improve mapping accuracy. Feature and attribute data from any markers present can be collected, the data including the position of measurement.

Computation steps to generate the map can be performed concurrently with the data collection, or can take place after the data collection is complete. Those steps can generally take place as in the following description. Markov or other probability techniques as is customary for SLAM can be employed, but can also be supplemented using a weighted probability attribute for markers located to improve the accuracy of the resulting map, particularly under difficult mapping conditions. The most likely actual positions of surfaces can be stored as a spatial model or representation of the space in point-cloud format. In general, a point-cloud format is a method of storing spatial data as points that are "filled", "empty" or "unknown." Each marker or feature sensed can also be associated with a particular position on the map.

The map can also be positioned and oriented in a universal uniform spatial reference frame. If GPS Markers were used, the map can be positioned globally according to marker locations. If GPS Markers were not used initially, the resulting spatial model or map can be located in GIS or other global spatial information system by taking GPS readings from accessible positions in or near the building. If the position is outside the building, the offset can be measured from the GPS position to an identifiable point in the mapped area of the building. A second GPS reading can be taken from a second point and repeat the measurement to fix the location of the point-cloud map in GIS space, or an angular reading can be taken from the first point to align the building. Each floor of the building may be assumed to be level or additional readings may be taken to fix the building in additional dimensions.

While the process of making the map and aligning it in a universal uniform spatial reference frame has generally been described with respect to mapping indoor spaces, it should be understood that the methods and systems described herein can be applied to any space in which mapping in the universal reference frame cannot be done directly. For example, in any space where reception of satellite signals is poor for any reason, mapping cannot be performed directly in GPS coordinates. This condition can exist indoors, in crowded city centers, or in other areas where natural or man-made cover inhibits the reception of satellite signals.

The invention being thus disclosed and illustrative embodiments depicted herein, further variations and modifications of the invention will occur to those skilled in the art. All such variations and modifications are considered to be within the scope of the invention, as defined by the claims appended hereto and equivalents thereof.

What is claimed is:

1. A method for generating maps of a desired area that are referenced to a universal uniform spatial reference frame, the method comprising:
   a) providing a mobile platform having a mapping processor and at least one mapping sensor;
   b) apply the mapping sensor to determine the location of features to be mapped relative to the mobile platform;
   c) moving the mobile platform to a new location, applying the mapping sensor to determine the location of features to be mapped relative to the mobile platform, and generating or adding to a map the locations determined;
   d) repeating step (c) until the desired area is mapped;
   e) applying at least one mapping sensor to locate at least one position on the map of the desired area on a universal uniform spatial reference frame; and
   f) transforming positions on the map of the desired area into the universal uniform spatial reference frame.

2. The method of claim 1, wherein the universal uniform spatial reference frame is the GIS.

3. The method of claim 2, wherein locations in the universal uniform spatial reference frame are determined in GPS coordinates.

4. The method of claim 1, wherein step (e) is performed earlier than or simultaneously with step (b) so that the position of the mobile platform is known relative to the universal uniform spatial reference frame and the location of features mapped are determined with respect to the universal uniform spatial reference frame.

5. The method of claim 4, wherein the transforming of step (f) is performed as locations of features are determined.

6. The method of claim 1, wherein step (e) is performed after the initiation of step (b).

7. The method of claim 1, wherein the at least one mapping sensor includes a range-finding sensor for determining the location of features to be mapped relative to the mobile platform.

8. The method of claim 7, wherein the at least one mapping sensor includes a GPS sensor to locate at least one position on the map of the desired area on a universal uniform spatial reference frame by positioning the mobile platform in a known position in the map of the desired area having an adequate GPS signal strength and taking a GPS location fix at that point.

9. The method of claim 7, wherein the at least one mapping sensor includes an odometry sensor.

10. The method of claim 7, wherein the at least one mapping sensor includes an inertial navigation sensor.

11. The method of claim 7, wherein the at least one mapping sensor includes a sensor for determining the location of a marker.

12. The method of claim 11, wherein the at least one mapping sensor includes a sensor for determining the global orientation of a marker.

13. The method of claim 11, wherein the marker has a known location in the universal uniform spatial reference frame.

14. The method of claim 12, wherein the marker has a known location and orientation in the universal uniform spatial reference frame.

15. The method of claim 11, wherein the sensor for determining the location of a marker is an information transmitter.

16. The method of claim 15, wherein the sensor for determining the location of a marker is an RFID sensor.

17. The method of claim 12, wherein the sensor for determining the location and global orientation of a marker is an information transmitter.

18. The method of claim 11, wherein the sensor for determining the location of a marker is an image sensor.

19. The method of claim 12, wherein the sensor for determining the location and global orientation of a marker is an image sensor.

20. The method of claim 11, wherein the range-finding sensor determines the location of a marker by determining a shape of the marker that is indicative of the feature being a marker.

21. The method of claim 12, wherein the range-finding sensor determines the location and global orientation of a marker by determining a shape of the marker that is indicative of the feature being a marker and its orientation.

22. A method for generating maps of a desired area that are referenced to a universal uniform spatial reference frame, the method comprising:
   a) providing a mobile platform having a mapping processor and at least one mapping sensor;
   b) providing a marker having known location in the universal uniform spatial reference frame;
   c) moving the mobile platform to a location within mapping range of the marker;
   d) applying the mapping sensor to determine the location of marker and communicating the location of the marker in the universal uniform spatial reference to the mobile platform;
   e) transforming positions on the map of the desired area into the universal uniform spatial reference frame.

23. The method of claim 22, wherein the marker has a known location and global orientation in the universal uniform spatial reference frame.

24. The method of claim 22, wherein the at least one mapping sensor includes a range finding sensor for determining the location of features to be mapped relative to the mobile platform.

25. The method of claim 24, wherein the range finding sensor determines the location of a marker by determining a shape of the marker that is indicative of the feature being a marker.

26. The method of claim 25, wherein the range-finding sensor determines the global orientation of a marker by determining the orientation of the marker that is indicative of the feature being a marker.

27. The method of claim 22, wherein the desired area is substantially indoors.

28. The method of claim 22, wherein the desired area is substantially outdoors.

29. The method of claim 22, wherein the marker is positioned in a location where a GPS signal is available.

30. The method of claim 22, wherein the mapping sensor is applied to determine the location of the marker from at least two different positions.

31. The method of claim 30, wherein the mapping sensor is applied to determine the location and global orientation of the marker two different positions.

* * * * *